US011940374B2

United States Patent
Nelson et al.

(10) Patent No.: US 11,940,374 B2
(45) Date of Patent: Mar. 26, 2024

(54) CONTINUOUS TUNABLE RF SENSOR USING RYDBERG ATOMS WITH HIGH TRANSMISSIVITY

(71) Applicant: Honeywell International Inc., Charlotte, NC (US)

(72) Inventors: Karl D. Nelson, Plymouth, MN (US); Matthew Wade Puckett, Phoenix, AZ (US); Neal Eldrich Solmeyer, Edina, MN (US); Robert Compton, Loretto, MN (US)

(73) Assignee: Honeywell International Inc., Charlotte, NC (US)

( * ) Notice: Subject to any disclaimer, the term of this patent is extended or adjusted under 35 U.S.C. 154(b) by 403 days.

(21) Appl. No.: 17/408,215

(22) Filed: Aug. 20, 2021

(65) Prior Publication Data
US 2022/0228972 A1     Jul. 21, 2022

Related U.S. Application Data

(60) Provisional application No. 63/140,049, filed on Jan. 21, 2021.

(51) Int. Cl.
*G01N 21/17* (2006.01)
*G02F 1/35* (2006.01)
(Continued)

(52) U.S. Cl.
CPC .......... *G01N 21/17* (2013.01); *G02F 1/3507* (2021.01); *G02F 1/3551* (2013.01); *G02F 1/37* (2013.01);
(Continued)

(58) Field of Classification Search
CPC ..... G01N 21/17; G02F 1/3507; G02F 1/3551; G02F 1/37; G01F 2202/20; H01S 3/0092; H01S 3/094096; H01S 3/10053
See application file for complete search history.

(56) References Cited

U.S. PATENT DOCUMENTS 9,970,973 B2    5/2018  Anderson et al.
10,509,065 B1 * 12/2019 Shaffer ............. G01R 29/0885
(Continued)

FOREIGN PATENT DOCUMENTS

CN      103825167 B    4/2015
CN      104882783 A    9/2015
(Continued)

OTHER PUBLICATIONS

Anderson et al., "Rydberg atoms for radio-frequency communications and sensing: atomic receivers for pulsed RF Field and phase detection," arXiv:1910.07970v1, Oct. 17, 2019, pp. 1 through 10.
(Continued)

*Primary Examiner* — Blake C Riddick
(74) *Attorney, Agent, or Firm* — Fogg & Powers LLC

(57) ABSTRACT

A continuously tunable radio frequency (RF) sensor system is provided. The system includes a pump laser system that includes first and second pump lasers, at least one frequency modulator to modulate frequencies of first and second laser light from the pump lasers to first and second select frequencies, a switch system to selectively pass one of the first and second laser light, an amplifier to amplify the passed laser light, a frequency doubler to double the frequency of the amplified laser light to generate pump light. A laser source lock system is in communication with the pump laser system to ensure a frequency of the pump light is referenced to atoms in a vapor cell and provide a probe light. The pump light and probe light are transmitted through the vapor cell. A detector measures the probe light that passed through the vapor cell.

20 Claims, 13 Drawing Sheets

(51) Int. Cl.
*G02F 1/355* (2006.01)
*G02F 1/37* (2006.01)
*H01S 3/00* (2006.01)
*H01S 3/094* (2006.01)
*H01S 3/10* (2006.01)

(52) U.S. Cl.
CPC ...... H01S 3/0092 (2013.01); H01S 3/094096 (2013.01); H01S 3/10053 (2013.01); *G02F 2202/20* (2013.01)

(56) References Cited

U.S. PATENT DOCUMENTS

| | | |
|---|---|---|
| 10,763,966 B1 | 9/2020 | Deb et al. |
| 10,802,066 B1* | 10/2020 | Keaveney ........... G01R 29/0885 |
| 2016/0363617 A1* | 12/2016 | Anderson ........... G01R 29/0885 |
| 2019/0187198 A1 | 6/2019 | Anderson et al. |
| 2020/0292606 A1* | 9/2020 | Holloway ........... G01R 29/0892 |
| 2020/0295838 A1 | 9/2020 | Gordon et al. |
| 2021/0048465 A1* | 2/2021 | Anderson ........... G01R 29/0878 |
| 2022/0196716 A1* | 6/2022 | Anderson ............. G01R 29/10 |
| 2023/0137266 A1* | 5/2023 | McBride ................ G01V 8/005 250/389 |

FOREIGN PATENT DOCUMENTS

| | | |
|---|---|---|
| CN | 106802373 A | 6/2017 |
| CN | 112285444 A | 1/2021 |
| JP | 2020052020 A | 4/2020 |

OTHER PUBLICATIONS

Fan, et al., "Atom based RF electric field sensing," Journal of Physics B: Atomic, Molecular and Optical Physics 48 (2015) 202001, Sep. 9, 2015, pp. 1 through 17, IOP Publishing Ltd.

Gordon et al. "Weak electric-field detection with sub-1 Hz resolution at radio frequencies using a Rydberg atom-based mixer," AIP Advances 9, 045030 (2019), Apr. 25, 2019, pp. 1 through 6, AIP Advances.

Jechow et al., "Highly efficient single-pass frequency doubling of a continuous-wave distributed feedback laser diode using a PPLN waveguide crystal at 488 nm," Optics Letters, Oct. 15, 2007, pp. 3035 through 3037, vol. 32, No. 20.

Jing et al., "Quantum superhet based on microwave-dressed Rydberg atoms", arXiv:1902.11063v1, Feb. 28, 2019, pp. 1 through 10.

Kumar et al., "Atom-Based Sensing of Weak Radio Frequency Electric Fields Using Homodyne Readout," Scientific Reports, 7:42981, Feb. 20, 2017, pp. 1 through 10, www.nature.com/scientificreports.

Meyer et al., "Assessment of Rydberg atoms for wideband electric field sensing," J. Phys. B: At. Mol. Opt. Phys. 53. 034001, Oct. 1, 2019, pp. 1 through 15.

Meyer et al., "Waveguide-coupled Rydberg spectrum analyzer from 0 to 20 GHZ," arXiv: :2009.14383v1, Sep. 30, 2020, pp. 1 through 9.

* cited by examiner

CONTINUOUS TUNABLE RF SENSOR USING RYDBERG ATOMS WITH HIGH TRANSMISSIVITY

CROSS-REFERENCE TO RELATED APPLICATIONS

This application claims priority to U.S. Provisional Application Ser. No. 63/140,049, same title herewith, filed on Jan. 21, 2021, which is incorporated in its entirety herein by reference.

BACKGROUND

The ability to detect radio-frequency (RF) signals in communication system applications, situational awareness system applications as well as electronic warfare system applications, etc. is desired. For example, in electronic warfare situations the ability to interception or detect RF signals transmitted by unfriendly operators is imperative. The concern is not only in the area of covert communications, but also in navigation, where jamming and spoofing of GPS and other navigation signals by unfriendly operators may threaten freedom of movement. Common techniques unfriendly operators use to reduce the probably of interception of the covert or jamming RF signals is by transmitting very faint signals, by hopping around in frequency or by spreading their signal across a wide bandwidth.

In order to detect these signals or utilize such communication protocols, the ability to measure arbitrary frequencies over a wide band of the RF spectrum with high-sensitivity, switching speed, dynamic range, and frequency resolution is needed. One issue encountered when trying to detect these types of RF signals is that antennas or other elements (sensor head) can distort the RF field to be sensed making detection difficult. Hence it is desired to have a sensor head that minimally distorts the RF field.

SUMMARY

The following summary is made by way of example and not by way of limitation. It is merely provided to aid the reader in understanding some of the aspects of the subject matter described. Embodiments include a continuously tunable RF sensor using Rydberg atoms with high transmissivity for detecting RF signals.

In one embodiment, a continuously tunable radio frequency (RF) sensor system is provided. The sensor system includes a vapor cell with alkali atoms, an optical train, and a detector. The optical train includes a laser source lock system and a pump laser system. The laser source lock system is configured to generate probe light of a first wavelength. The pump laser system is configurate to generate pump light of a select second wavelength. The pump laser system includes at least a first pump laser to generate a first laser light of the select second wavelength, at least a second pump laser to generate a second laser light of the select second wavelength, at least one frequency modulator, a switch system and a frequency doubler. The probe light is in communication with the first pump laser and the second pump laser to ensure a frequency of the first pump laser and the second pump laser is referenced to the alkali atoms in the vapor cell. The at least one frequency modulator is configured to provide a local oscillator and at least one of frequency offsets, time-varying offsets and frequency sweeps to the first laser light and the second laser light. The switch system is configured to pass one of the first laser light and the second laser light to an amplifier. The frequency doubler is coupled to receive amplified laser light from the amplifier. The frequency doubler is configured to double a frequency of the amplified laser light to generate the pump light, the pump light and probe light transmitted through the vapor cell. The detector is configured to measure the probe light passed through the vapor cell to determine if an RF signal has been detected.

In another embodiment, another sensor system that includes a vapor cell including alkali atoms, an optical train, a pump laser system and a detector is provided. The optical train includes a laser lock system. The laser lock system includes a master laser, a first optical phase lock loop, a frequency comb and a second optical phase lock loop. The master laser generates a probe light of a first wavelength. The first optical phase lock loop is in communication with a master laser of the laser source lock system. The frequency comb is in communication with the first optical phase lock loop. The second optical phase lock loop is in communication with the frequency comb. The pump laser system is configured to generate pump light of a select second wavelength. The pump laser system includes at least one first pump laser, at least one second pump laser, at least one frequency modulator, a resonator based fast switch system and a frequency doubler. The at least one first pump laser is used to generate a first laser light of the select second wavelength. The at least a second pump laser is used to generate a second laser light of the select second wavelength. The first pump laser and the second pump laser are in communication with the second optical phase loop to provide frequency references for the first pump laser and the second pump laser. The at least one frequency modulator is configured to provide a local oscillator and at least one of frequency offsets, time-varying offsets and frequency sweeps to the first laser light and the second laser light. The resonator based fast switch system is configured to pass one of the first laser light and the second laser light to an amplifier. The frequency doubler is coupled to receive amplified laser light from the amplifier. The frequency doubler is configured to double a frequency of the amplified laser light to generate the pump light, the pump light and probe light transmitted through the vapor cell. The detector is configured to measure the probe light passed through the vapor cell to determine if an RF signal has been detected.

In still another embodiment, a method of detecting radio frequency (RF) signals, the method includes, generating a first laser light of a first wavelength with a first laser; generating a second laser light of the first wavelength with a second laser; providing frequency references for the first laser light and the second laser light with a probe light having a second wavelength; selectively switching between passing the first laser light and the second laser light to an amplifier; modulating the first laser light and second laser light to select frequencies before the first laser light and the second laser light are selectively passed to the amplifier; amplifying the passed first laser light and second laser light with the amplifier; doubling the frequency of the amplified first laser light and second laser light to generate pump light; passing the pump light and the probe light through a vapor cell; and measuring the probe light to determine if an RF signals is present.

BRIEF DESCRIPTION OF THE DRAWINGS

Embodiments can be more easily understood and further advantages and uses thereof will be more readily apparent, when considered in view of the detailed description and the following figures in which.

In accordance with common practice, the various described features are not drawn to scale but are drawn to emphasize specific features relevant to the subject matter described. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the embodiments, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Embodiments provide a continuously tunable RF sensor with a sensor head that is designed to minimally distort the RF field so that faint RF signals can be detected with high fidelity. By probing transitions in an electro-magnetically induced transparency (EIT) scheme, an applied field with frequency near transition resonances will produce an energy shift of the levels that indicate an RF signal is present that can be measured by scanning using applied laser frequencies.

Embodiments of the continuously tunable RF sensor use Rydberg atoms with high transmissivity for detecting RF signals across a wide frequency band. The continuously tunable sensor may use alkali atoms that are excited to states with high principle quantum number, n. These states are known as Rydberg states. Examples of alkali atoms include rubidium and cesium atoms. Rydberg-to-Rydberg transitions range in frequency from 10s of MHz to several THz. Although Rydberg atoms are highly excitable with hundreds of possible resonance levels, Rydberg based sensors are typically only sensitive at very discrete frequencies at transitions at resonance levels. Embodiments provide a continuous frequency range by boosting the sensitivity off resonance by applying a local oscillator (LO) to pump light by modulation.

When a local oscillator field is applied to the atoms in addition to the signal field, the LO produces a beat note in the measured probe beam intensity. This increases sensitivity to the signal field while reducing the effects of noise from heterodyne techniques. An application of a LO is usually accomplished with a microwave horn or other components that can significantly perturb the incoming signal field. In embodiments, a LO is applied through modulation of applied lasers which allows a direct field sensitivity of the sensor head to increase without perturbing the field. The modulation scheme described below does not rely on any particular symmetries between Rydberg levels that some other optical modulation based heterodyne techniques require, making it suitable for continuously tuning across a wide band.

Figure 1A:
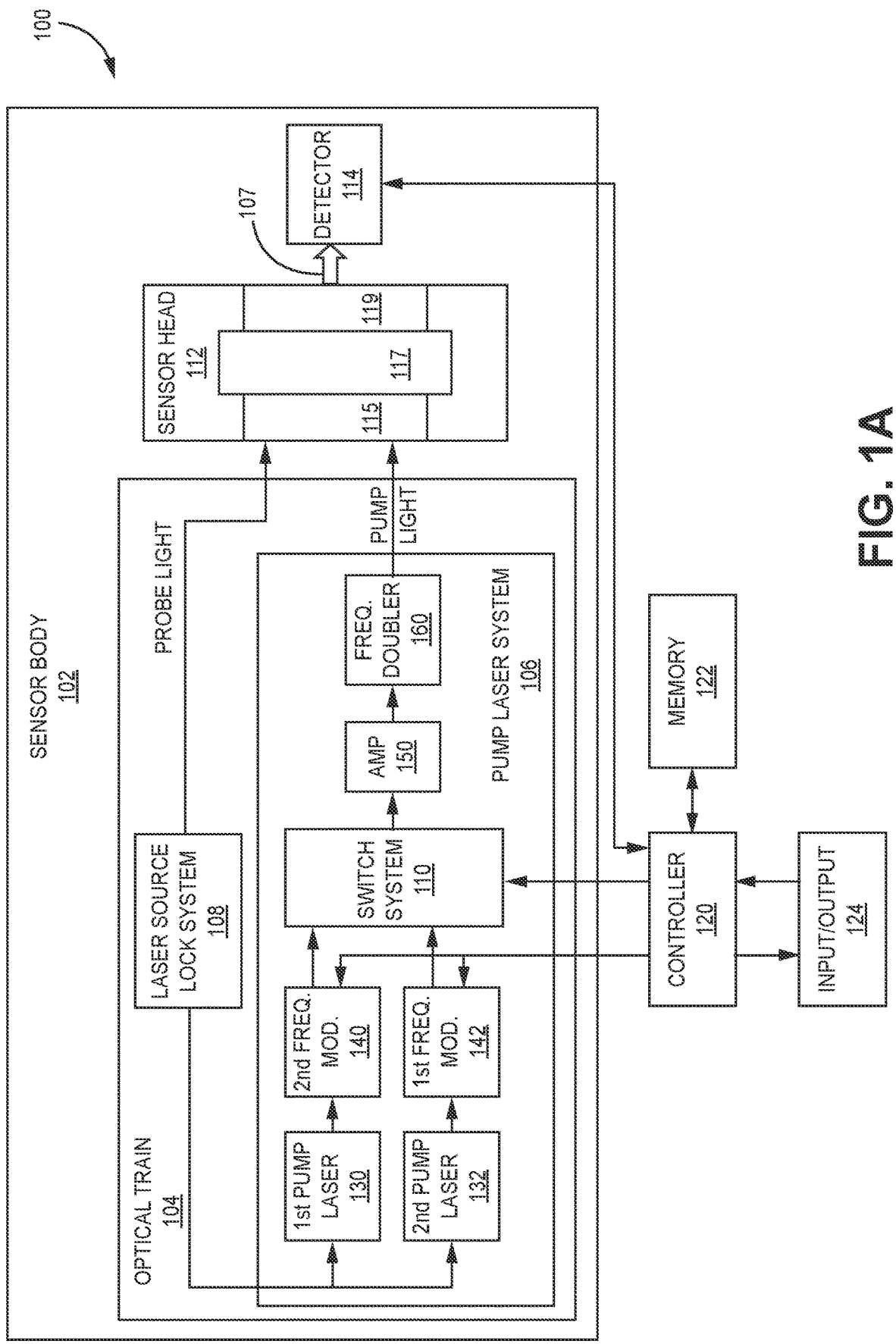
FIG. 1A illustrates a block diagram of a continuously tunable RF sensor system according to one exemplary embodiment.

Referring to FIG. 1A, a block diagram of a continuously tunable RF sensor system 100 of an example embodiment is illustrated. This continuously tunable RF sensor system 100 example includes a sensor body 102, a controller 120, a memory 122 and an input/output 124.

The sensor body 102 includes an optical train 104 that generates a probe light and pump light of a select frequency that is passed to the sensor head 112. The sensor head 112 may include a vapor cell 117, a beam delivery optic 115 (fiber or free space lens) that couples the light into the vapor cell 117, and a beam collection optic 119 (fiber or free space lens) that collects the light after transmission through the vapor cell 117 and then delivers it to the detector 114 in the sensor body. The detector 114 measures energy shifts in atoms states in the vapor cell that indicate the presence of an RF signal. In particular, the presence of the pump light will alter the absorption of the probe light with a spectral shape that depends on an incident RF field. The probe light is collected at the detector 114 and measured with a photodiode or other sensor in making a measurement.

The optical train 104 in this example embodiment includes a pump laser system 106 and a laser source lock system 108. The pump laser system 106 generates the pump light passed to the sensor head 112. The laser source lock system 108 generates the probe light and is in communication with the pump laser system 106. The laser source lock system 108 further provides a frequency reference for the pump laser system 106 as is discussed in detail below to ensure the laser frequencies are referenced to atoms in the vapor cell 117 of the sensor head 112.

The pump laser system 106, in this example embodiment, includes a first pump laser 130, a second pump laser 132, a first frequency modulator 140, a second frequency modulator 142, a switch system 110, an amplifier 150 and a frequency doubler 160 all of which are also discussed in detail below. The switch system 110 is used when changing the optical frequency of light signals generated by the pump laser system 106 to be able to monitor different frequency bands for RF signals. A detailed description of the components of the pump laser system 106 is further described below in regard to FIG. 9.

In the example of FIG. 1A, a controller 120 is in communication with the switch system 110 to at least in part control shifting light generated from the first pump laser 130 and the second pump laser 132 based on operational instructions that may be stored in memory 122. The memory 122 may also be used in embodiments to store information relating to detected RF signals. The controller 120 in this example is also in communication with the detector 114 and an input/output 124. The input/output 124 may be an interface that allows for a user to provide operating instructions that can be stored in the memory 122 and implemented by the controller 120. The input/output 124 may also generate a detected RF signal notice when an RF signal has been detected at the detector 114.

In general, the controller 120 may include any one or more of a processor, microprocessor, a digital signal processor (DSP), an application specific integrated circuit (ASIC), a field program gate array (FPGA), or equivalent discrete or integrated logic circuitry. In some example embodiments, controller 120 may include multiple components, such as any combination of one or more microprocessors, one or more controllers, one or more DSPs, one or more ASICs, one or more FPGAs, as well as other discrete or integrated logic circuitry. The functions attributed to the controller herein may be embodied as software, firmware, hardware or any combination thereof. The controller 120 may be part of a system controller or a component controller. The memory 122 may include computer-readable operating instructions that, when executed by the controller 120 provides functions of the continuously tunable RF sensor system 100. Such functions may include the functions relating to selecting frequency bands to be monitored as described below. The computer readable instructions may be encoded within the memory 122. Memory 122 is an appropriate non-transitory storage medium or media including any volatile, nonvolatile, magnetic, optical, or electrical media, such as, but not limited to, a random access memory (RAM), read-only memory (ROM), non-volatile RAM (NVRAM), electrically-erasable programmable ROM (EEPROM), flash memory, or any other storage medium.

Embodiments apply a single modulation sideband to the pump laser system 106, where the modulation frequency will be close, with a small detuning to the signal field. By solving Lindblad equations for the system with appropriate approximations, a beat note at the frequency is produced which oscillates slowly with respect to all other optical or RF frequencies in the system, making it suitable for lock in detection. This modulation acts analogously to the LO applied directly through a microwave, and also allows continuous tuning over a broad range.

Embodiments allow a signal field to be measured with high sensitivity in a small frequency band of a few GHz around a given Rydberg-to-Rydberg transition by tuning the frequency of the modulation on the laser. In order to increase the sensitivity band, the ability to address multiple Rydberg-to-Rydberg transitions is added by 'handing-off' between two source lasers (the first pump laser 130 and the second pump laser 132) in the pump laser system 106.

To accomplish the "handing off," some embodiments use a switch system 110 that is, in one embodiment, a resonator-based switch system 110 that allows for fast changes of several hundred GHz. Other methods of switching may be used. Outputs of the pump lasers 130 and 132 are input into the switch system 110.

The resonator-based switch system 110, in some embodiments, works by having multiple lasers incident on a circuit with two (or more) optical resonators that can be tuned (by temperature or other method) so that only light resonant with a resonator transmits through the device. When acquiring data for measurement at one frequency, while the pump laser, 130 or 132, is resonant with one of the resonators, a second source laser (the other of 130 and 132) can be pre-tuned to a next desired target frequency. Then, at the desired time, the second laser and the second resonator can be brought into resonance with one another and the first laser brought out of resonance with the first resonator so that first laser is no longer being transmitted while the second laser is transmitting. This switches the applied laser frequency, and hence the target measured frequency, in as little as 10 microseconds. Further, the range of this frequency shift can be arbitrarily large. The switching coupled with the continuous tuning around the transitions allows for continuous measurements across a wide band, as high as 40 GHz or more.

Because the LO is applied by modulating laser output in the optical train 104, the sensor head 102 of embodiments only needs to comprise a small amount of gas of alkali atoms, a glass vapor cell 117 and a fiber optic (or free space) optical coupling 107 to the detector 114. The probe light can be collected into the optical coupling 107 and brought to the detector 114, which, in an embodiment, may be located away from the sensor head 112. This arrangement allows the sensor head 112 to have very minimal effect on the signal field, allowing for a high fidelity measurement.

Figure 1B:
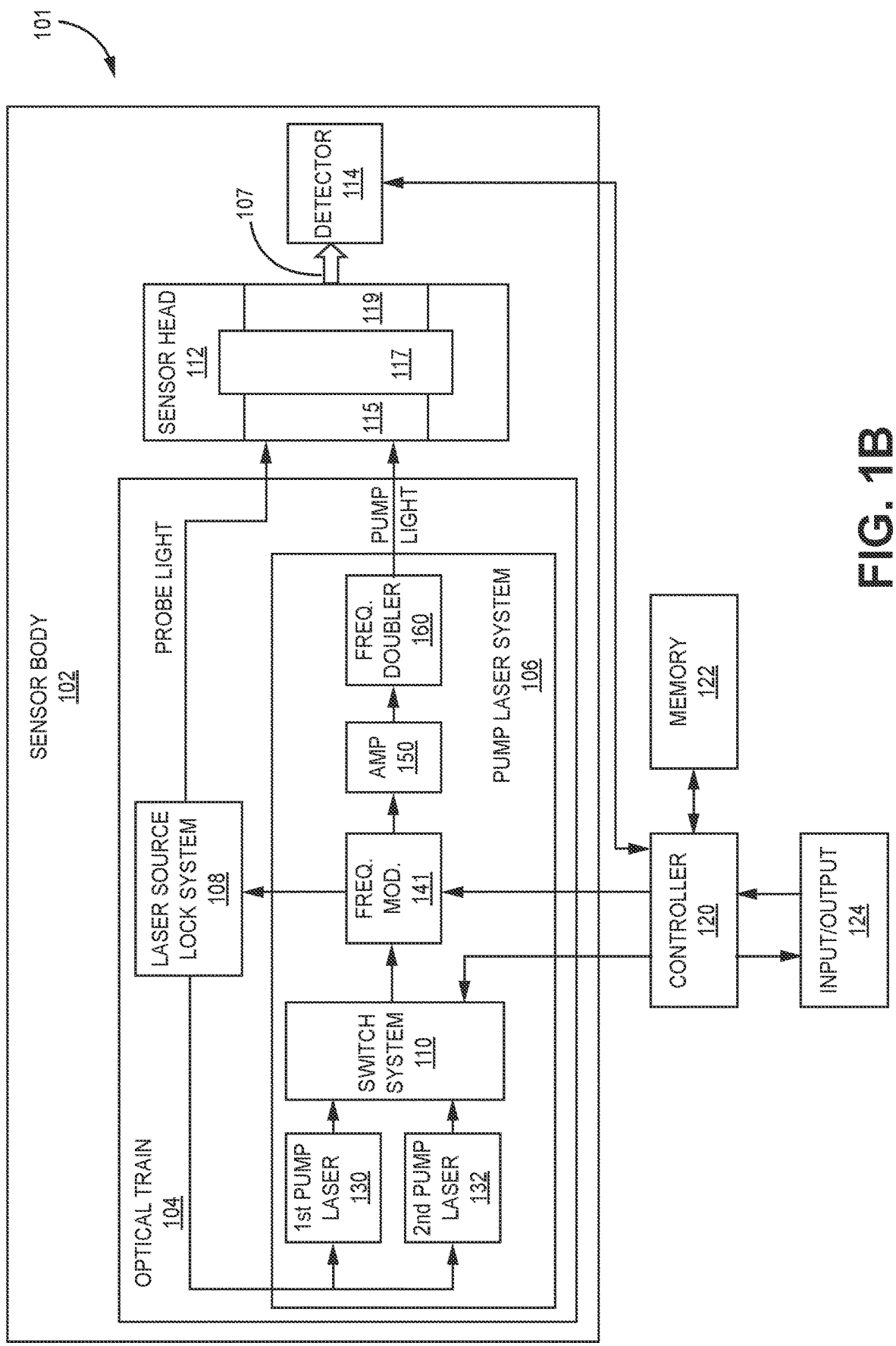
FIG. 1B illustrates a block diagram of a continuously tunable RF sensor system according to one exemplary embodiment.

FIG. 1B illustrates another example embodiment of a continuously tunable RF sensor system 101. In this example, only one frequency modulator 141 is used. Frequency modulator 141 is positioned after the switch 110. Frequency modulator 141 is configured to modulate light output of the switch system 110 and may also provide modulation for the laser source lock system 108 as discussed below.

Figure 2:
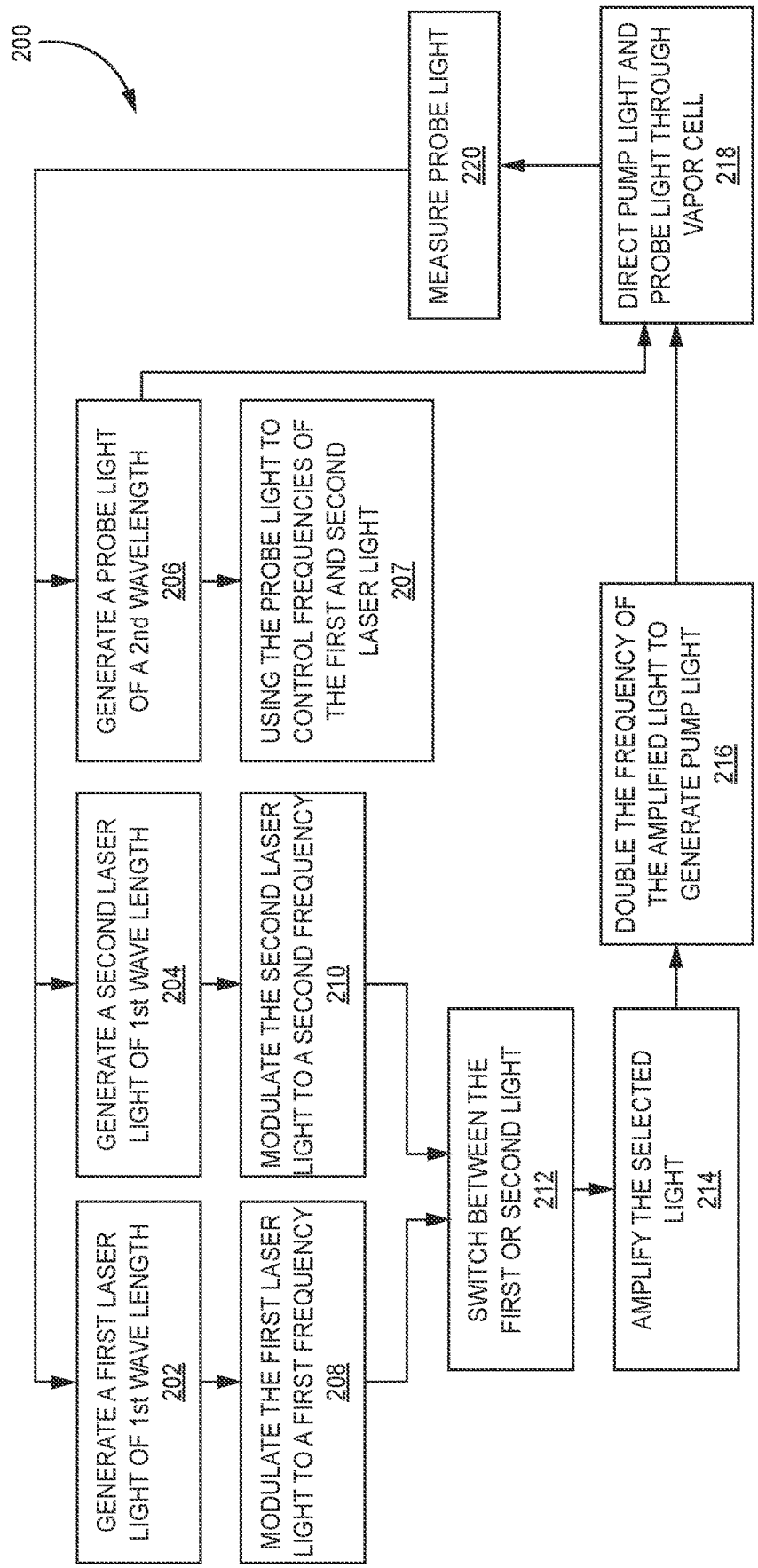
FIG. 2 illustrates a continuously tunable RF sensor system flow diagram according to one exemplary embodiment.

FIG. 2 illustrates a continuously tunable RF sensor system flow diagram 200 of one example embodiment. Flow diagram 200 is provided as a series sequential blocks. The sequence of the blocks may occur in a different order or in different parallel sequences in other embodiments. Flow diagram 200 includes the generating of a first laser light of a first wavelength at block (202) with a first pump laser 130, the generating of a second laser light of the first wavelength at block (204) with a second pump laser 132 and generating a probe light of a second wavelength at block (206) with a probe laser. The probe light is used in part to control frequencies of the first and second laser light at block (207) to ensure that the laser frequencies of light from the first and second pump lasers 130 and 132 are referenced to the atoms in the vapor cell 117.

The first laser light is modulated to a first frequency at block (208) and the second laser light is modulated to second frequency at block (210) by modulators 140 and 142. An example of a type of frequency modulator that can used is a lithium niobate (LiNb0$_3$) electro-optic modulator. Other types of modulators may also be used that generate sidebands on the laser frequency which provides the RF modulation on the laser as well as modulator that apply a saw tooth phase shift which provides fine tuning offset of the laser frequency. Further in one example embodiment, one or more of the modulators 140 142 and may provide modulation for the laser source lock system 108. The switch system 110 selects which of the first or second light to pass to the amplifier at block (212) at a given time. The switch system may include a resonator based fast switch and serrodyne shifters that are used for fine-tuning.

At block (214) the passed first or second laser light is amplified with amplifier 150. A frequency of the amplified laser light is doubled at block (216) to generate the pump light. The probe light and the pump light are passed through a vapor cell containing alkali atoms at block (218). The probe light is measured at block (220) to determine if an RF signal has been detected. The process then continues checking for RF signal at a different band by modulating the first and second light to different frequencies and switching between the first and second modulated light with the switch system 110 to enable fast switching between frequencies as discussed in detail below.

A discussion of Rydberg-based electromagnetic sensors is further provided for background to embodiments. Rydberg-based electromagnetic field sensors have the potential for sensitivities to the electric field as low as −190 dBI/Hz, fundamentally limited by the atom shot noise. Where dBI stands for dB-isotropic, comparing antenna gain to an isotropic emitter. 0 dBI=10 log 10(1 W/m2)=−10 dBm/cm$^2$. Until recently, the sensitivity of these sensors has been limited to −90 dBI/Hz by the photon shot noise. However, mixing in a LO microwave field near the target frequency takes advantage of the quadratic dependence of the AC Stark shift, when off-resonance from a Rydberg to Rydberg transition, to produce an interference term that linearizes the (otherwise rapidly decreasing) sensitivity to the signal strength. This has resulted in sensitivities as low as −130 dBI/Hz.

Sensitivities in the range of −115 to −165 dBI/Hz exceed those of current sensors, which are limited by atom transit, probe laser phase noise, and pump power. Embodiments of a tunable Rydberg frequency sensor (TRFS) (continuous tunable RF sensor system 100) advance the state-of-the-art sensitivity by applying a novel modulation scheme, with high pump powers, and a large number of atoms, and ensuring all other sources of noise are kept sufficiently below the shot noise limits.

Figure 3:
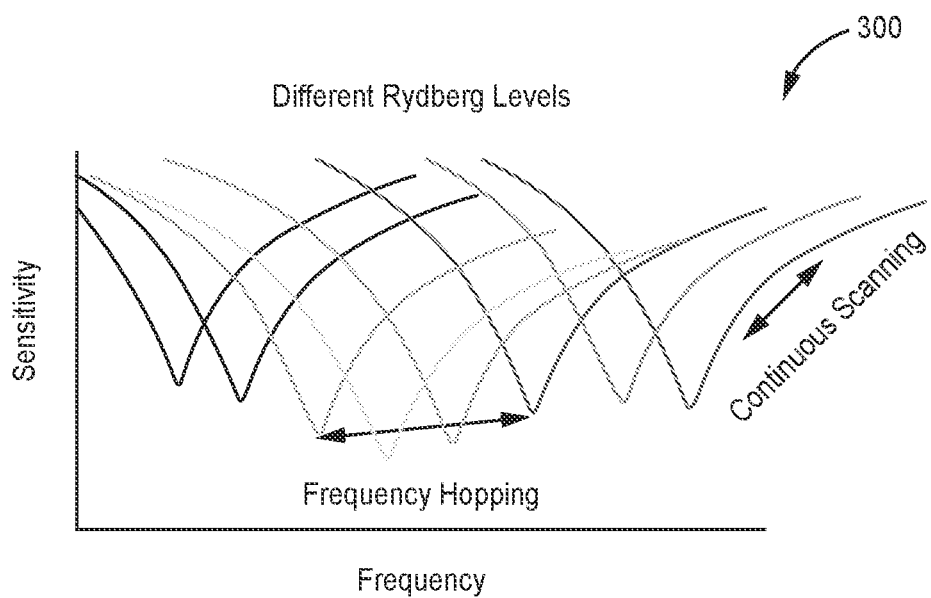
FIG. 3 illustrates a Rydberg sensitivity versus frequency graph.

Heterodyne measurements greatly improve the sensitivity to frequencies that are far detuned from any Rydberg transition frequencies. Tuning the LO frequency provides the sensor with the ability to respond to a continuous band of a few GHz around the resonance frequency of a Rydberg-to-Rydberg transition, with sensitivity comparable to the sensitivity on resonance, and decreasing as the detuning increases as illustrated in FIG. 3. In FIG. 3, a Rydberg sensitivity versus frequency graph 300 is illustrated. Graph 300 illustrates different Rydberg transitions for frequency hopping while employing continuous scanning around the resonances for high sensitivity where the lower sensitivity corresponds to being able to measure a smaller electric field.

In order to measure a wide band (for example, 10 MHz to 40 GHz) with high sensitivity, embodiments of the TRFS perform measurements in the frequencies around several Rydberg levels, shown as the different shaded lines in graph 300 of FIG. 3, where lower sensitivity corresponds to a smaller electric field. This frequency hopping, or channel switching, is addressed with resonator switches described below in detail. The continuous scanning is accomplished by changing the detuning of the LO with fast on-chip modulators 140 and 142. In addition, the optical frequencies may be fine-tuned with serrodyne shifters in the modulators 140 and 142 to perform measurements with optimal sensitivity.

In a first phase, an embodiment of a TRFS. In one embodiment, a desired range is 10 MHz to 40 GHz, which can be addressed by targeting the n~50-60 range, with resonances from 10-30 GHz with the nd5/2→(n+1)p3/2 and ns→np1/2 transitions. And targets transitions in the n~70-80 range with RF transitions near 5 GHz for frequency measurements spanning the range 10 GHz to 10 MHz. If the target RF is outside the range of the near-resonant LO measurement, the laser system (optical train 104) will frequency hop to a neighboring Rydberg transition with a suitable sensitivity.

The TRFS embodiments utilizes the agility of its laser system to apply the LO via modulation of the optical frequency rather than a direct microwave antenna that may interfere with the transparency of the vapor cell. Electro-optic modulators 140 and 142 may be integrated into the optical train 104 (optical circuit train), described further below, in an example embodiment. These modulators 140 and 142 are designed to have low loss and are designed for voltages less than 20 V, which enables fast scanning. In principle, voltages as large as 150 V are possible. Larger voltages may be employed to increase the dynamic range.

Embodiments of the TRFS 100 use an architecture where a local oscillator for a heterodyne measurement is provided by modulation of a pump laser 130 or 132 in the optical train 104. A modulation frequency on the coupling laser 130 or 132 will act analogously to the LO applied through direct microwaves in previous heterodyne measurements. This allows the TRFS to linearize the response to the signal field off-resonance and produce a beat note that can be spectroscopically measured, thus decreasing the noise.

Figure 4:
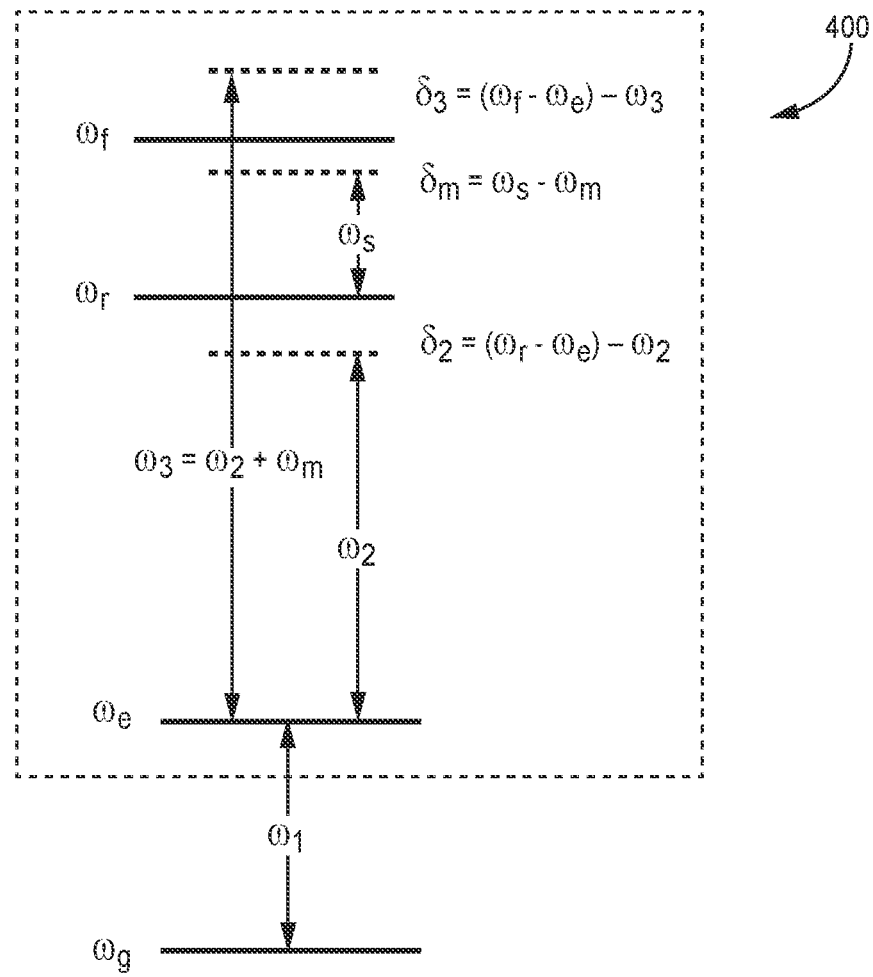
FIG. 4 illustrates an energy level diagram of a 4-state system with aground state.

The applied lasers and energy level diagram of a 4-state system with ground state $|g\rangle$, excited state $|e\rangle$, and two Rydberg states, $|r\rangle$ and $|f\rangle$ are shown in energy level diagram 400 of FIG. 4. The frequency of the probe ($\omega_1$) is the commonly used D2 line at 780 nm, which requires a pump ($\omega_2$) at 480 nm to couple to higher Rydberg levels. The modulation frequency ($\omega_m$) is written onto the pump and is near in frequency to the signal frequency ($\omega_s$) with a small detuning $\delta_m = \omega_s - \omega_m$. In addition, we have the following detunings: $\delta_2 = (\omega_r - \omega_e) - \omega_2$, $\delta_3 = (\omega_f - \omega_e) - \omega_3$ and $\delta_m = \omega_s - \omega_m$.

To gain insight into this system, the upper three levels are discussed including excited state $|e\rangle$ with frequency $\omega_e$, and two Rydberg states ($|r\rangle$ and $|f\rangle$) with frequency $\omega_r$ and $\omega_f$. This model serves to describe an effective pump coupling that will alter the absorption of the probe. The Hamiltonian of the upper three levels can be written:

$$H = \begin{pmatrix} \hbar\omega_e & \Omega_2(e^{-it\omega_2} + e^{it\omega_2}) & \Omega_3(e^{-it\omega_3} + e^{it\omega_3}) \\ \Omega_2(e^{-it\omega_2} + e^{it\omega_2}) & \hbar\omega_r & \Omega_s(e^{-it\omega_s} + e^{it\omega_s}) \\ \Omega_3(e^{-it\omega_3} + e^{it\omega_3}) & \Omega_s(e^{-it\omega_s} + e^{it\omega_s}) & \hbar\omega_f \end{pmatrix} \quad (1)$$

Where the $\Omega$s are the Rabi frequencies corresponding to the relevant transitions. The Hamiltonian is first transformed into a rotating frame with a diagonal unitary matrix U with elements corresponding to the energy levels of the atom ($\omega_e$, $\omega_r$, and $\Phi_f$) with H'=i$\hbar$U$^\dagger$U+U H U$^\dagger$. Next, rotating wave approximations are made, and terms are removed that are oscillating at twice the optical frequencies. The Hamiltonian is then transformed back into the original basis. The Hamiltonian is then transformed into a basis with a diagonal unitary matrix U$_2$ comprised of three elements ($\omega_2$, 1, $\omega_s$). This basis is selected to reduce all the elements to constants, or terms oscillating slowly, i.e. at $\delta_m$. The definitions of detunings from FIG. 3 and a shift the overall energy level of the Hamiltonian is applied so that the Hamiltonian takes the form:

$$H_{eff} = \begin{pmatrix} 0 & \Omega_2 & \Omega_3 e^{it\delta_m} \\ \Omega_2 & \hbar\delta_2 & \Omega_s \\ \Omega_3 e^{it\delta_m} & \Omega_s & \hbar(\delta_3 - \delta_m) \end{pmatrix} \quad (2)$$

Figure 5B:
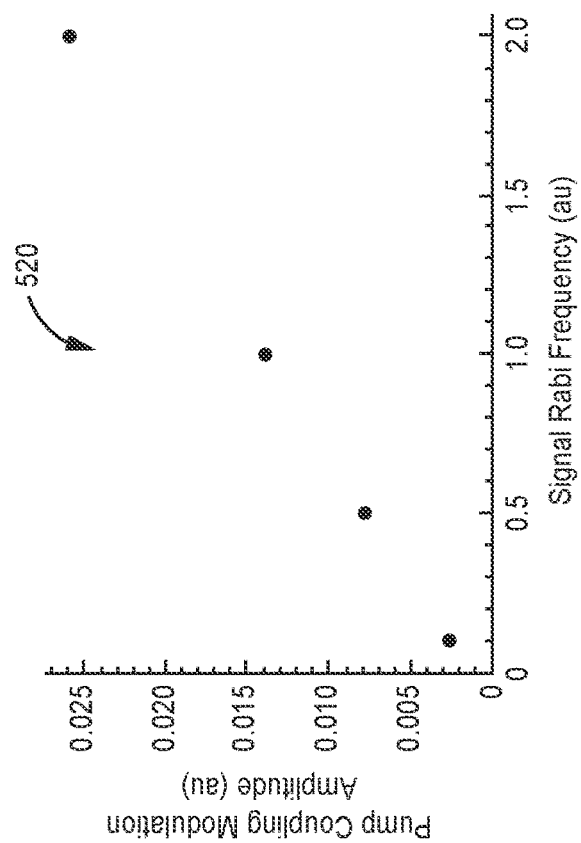
FIG. 5B illustrates a pump coupling modulation amplitude versus signal Rabi frequency graph.
Figure 5A:
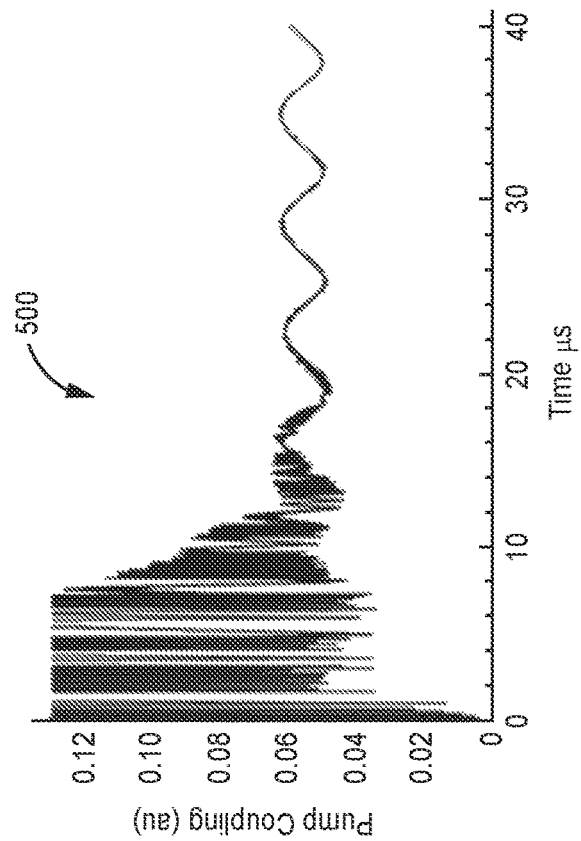
FIG. 5A illustrates a pump coupling versus time graph.

To obtain an effective probe coupling to |f⟩, taking into account both the |e⟩→|f⟩ and |e⟩→|f⟩ paths, the Hamiltonian in Equation (2) is numerically solved. The coherence between |e⟩ and |r⟩, $\rho_{13}$, is taken as an estimate of the size of an effective coupling that would be derived with the full 4-levels system. A numerical solution of $\rho_{13}$ of the Hamiltonian from Equation (2) plugged into a time dependent Lindblad equation (known in the art), is shown in the pump coupling versus time graph 500 of FIG. 5A. As illustrated, after a ~15 µs transient, the coupling settles into an oscillation at the frequency $\delta_m$. Further, the amplitude of that oscillation is linear in the size of the signal field, as seen in the pump coupling modulation amplitude versus signal Rabi frequency graph 520 of FIG. 5B. This suggests that the modulation frequency Wm acts analogously to the direct microwave local oscillator in heterodyne techniques recently demonstrated in Rydberg systems.

Experimentally, this effective pump coupling term will show up as an oscillation on the EIT absorption curve as measured by the probe (detector 114). A modulation of the probe transmission at the detuning between the signal and the LO, $\delta_m$ enables the modulation term to be read out spectroscopically, so that the term dependent on the signal field can be distinguished from the 'bulk' of the EIT curve formed from the coupling laser (pump light) with very low noise.

The detailed behavior of the signal field's effect on the probe beam (probe light) can be calculated by solving for the imaginary part of the $\rho_{ge}$ term in the density matrix for the complete 4-level system, or in fact, a full realistic system accounting for several nearby Rydberg levels for each target RF.

Intuitively the effective pump coupling to the upper states can be thought of as an interference between the paths |e⟩→|f⟩ and the path |e⟩→|r⟩→| f⟩. To arrive at an analytical expression for the effective pump coupling, a case where the state |r⟩ is adiabatically eliminated from the system and replaced with a two-photon transition is provided. This is justified because the off-resonant case is of interest where the signal is far detuned from the |r⟩→|f⟩ transition. Now the system can be thought of as two alternate paths for a transition from |e⟩→|f⟩ having a single photon transition at $\omega_3$ and a two-photon transition with photons at frequencies $\omega_2$ and $\omega_s$. The effective Rabi frequency can be taken as a sum of the Rabi frequencies, for the one photon path ($\Omega_3 e^{i\,t(\omega_2+\omega_m)}$+cc) and the two photon paths $$\left(\frac{\Omega_2 \Omega_s}{\delta_2} e^{it(\omega_2+\omega_s)} + cc\right),$$

using the effective Rabi frequency for a two-photon transition. The response of the probe transmission is quadratic in the Rabi frequency, as evidenced by the off-resonant AC stark shift. Squaring the sum of Rabi frequencies produces an interference term $$\Omega_c = \frac{\Omega_2 \Omega_3 \Omega_s}{\delta_2} e^{-it\delta_m}.$$

This interference term oscillates at $\delta_m$ and is linearly sensitive to the signal field and this expression serves as the analytic estimate of the modulation to the pump coupling Rabi frequency.

A measurement of the phase of the RF signal may be understood by tuning the LO to coincide with the signal frequency and run in a homodyne mode. Depending on the application, a heterodyne measurement may first be required to identify the carrier frequency. A similar measurement of the interference between two paths can be employed, keeping an explicit phase of both the probe and pump terms. However, with the interference, frequencies drop out of the resulting interference term while explicitly keeping in the analysis the phase of both the signal and modulation. This leads to an estimated pump coupling of the form: $\Omega_{eff}=\Omega_{eff0}\cos(\varphi_s-\varphi_m)$, where $\varphi_s$ and $\varphi_m$ are the phases of the signal and modulation RF fields, $\Omega_{eff}$ is an effective pump Rabi frequency with amplitude $\Omega_{eff0}$. In addition, this equation has a dependence on the relative phase of the signal and the modulator such that the modulation term in the pump coupling can be tuned between its maximum and zero by adjusting the relative phase.

The signal is measured as a function of the phase of the modulation so that the coupling goes from a maximum to a minimum. Thus, the relative phase between the signal and modulation is measured by the applied $\varphi_m$ that results in a peak coupling strength, and that peak coupling strength gives the amplitude of the measured field, with the appropriate atomic physics for scaling.

The sensitivity of a Rydberg sensor is based on tradeoffs between atom shot noise, photon shot noise, and line broadening effects like decoherence and Doppler broadening. Beginning with the atom shot noise as the fundamental limit to sensitivity, a vapor cell will have a length of 1 cm and a maximum beam size covering the central region with uniform RF field with a diameter 2 mm. In a room temperature, a Rb vapor cell this volume contains $10^8$ addressable atoms. It can be assumed that, because of the Doppler broadening which broadens the transition to ~3 MHz, which addresses 3/500 fewer atoms than the number at room temperature, with the full Doppler width being 500 MHz. This is due to the fact that the lasers will only address certain velocity classes of atoms.

The atom shot noise limit in units of the electric field, assuming a 1 second measurement time is given by:

$$\varepsilon_a = \frac{h}{\mu\sqrt{T_2 N}} \quad (3)$$

Where µ is the atomic dipole moment, $T_2$ is the coherence time, and N is the atom number. For an example, a state with a typical alkali dipole moment for a highly excited Rydberg state, $\mu=1745*e*a_0$, and coherence time of 100 ns, this leads to an atomic shot noise limits of 1.8 nV/cm (−165 dBI).

In practical measurements, the photon shot noise of the probe can limit the sensitivity. The signal to noise ratio (SNR) of a photon shot noise limited detector in a 1 Hz bandwidth is given by:

$$SNR_{PSN} = \sqrt{\frac{\eta P_{probe} \lambda_{probe}}{hc}} \quad (4)$$

Where $P_{probe}$ and $\lambda_{probe}$ are the power and wavelength of the probe beam, $\eta$ is the quantum efficiency of the detector, h is Plank's constant, and c is the speed of light. Assuming $\eta=0.25$ and $P_{probe}=50$ μW gives an $SNR_{PSN}$ of $5*10^6$.

To estimate the minimum measurable field from the photon shot noise maximum SNR, an estimate of the smallest resolvable change in Rabi frequency, $\delta\Omega$, is needed by measuring the minimum change in transmission that can resolve, $\delta T$. The sensitivity $\delta\Omega/\delta T$ may be determined by numerically simulating a non-heterodyne technique (which allows for the transmission with time independent equations to be solved) with an applied microwave field with a Rabi frequency, $\Omega$, that is analogous to the LO, and a small change in the Rabi frequency, $\delta\Omega$, that is analogous to the signal. The frequencies may be in the MHz and the transmission may be scaled to 1 in an example.

For these calculations it is assumed that the pump and probe each have waist radius of 1 mm, and that their Rabi frequencies are 0.8 MHz and 1.0 MHz. For the pump beam, this requires 100 mW of power, which may be achieved with the laser system described below. Then a standard calculation of the three-level system is performed by solving the Lindblad equation and applying the rotating wave approximation. In addition, a thermal distribution of atoms is assumed and that an average over the Doppler broadened signal is performed.

Figure 6B:
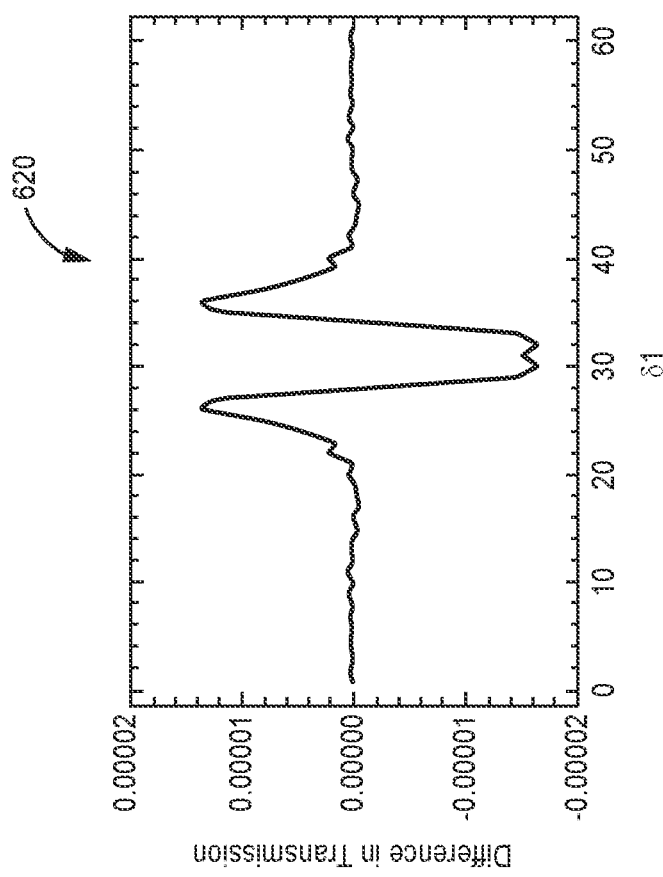
FIG. 6B illustrates a difference in transmission versus δ1 graph.
Figure 6A:
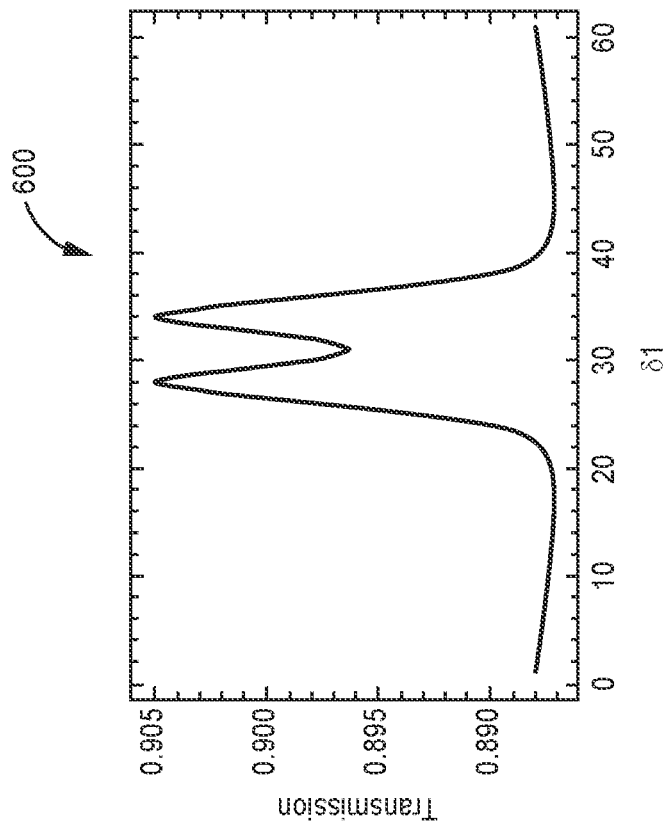
FIG. 6A illustrates a transmission versus δ1 graph.

A relatively large $\Omega$, i.e. large enough to be in the Autler-Townes regime, is applied and the susceptibility of the probe is computed. The susceptibility is then converted into the transmission of the probe with the number of atoms, absorption length, etc. There is a peak absorption of the probe of about 10% and an EIT feature of about 1% of the total probe transmission. This is plotted as a function of the probe detuning, normalized to 1, as seen in the transmission versus $\delta 1$ graph 600 of FIG. 6A.

A small $\delta\Omega$ is added to $\Omega$ and a difference of the transmission is taken with and without the $\delta\Omega$. The result of one such difference is plotted in the difference in transmission versus $\delta 1$ graph 620 of FIG. 6B. The smallest change in transmission that could resolve is estimated by considering the photon shot noise limited SNR. An estimate of the maximum signal to noise of $5*10^6$ has been determined. It is estimated that a modulation signal strength can be detected when it has a $SNR_{mod}$ of 1, which is to say that the signal from the modulation term is the same size as the noise and is therefore equal to $1/SNR_{PSN}$. By calculating multiple differences in transmission for multiple values of the modulation field, the size of a modulation field $\delta\Omega$ that gives rise to a difference of transmission at the level of $1/SNR_{PSN}=2*10^{-7}$, which is $\Omega_m=1$ kHz, can be identified.

Next, knowing the size of the expected modulation from the heterodyne measurement $$\Omega_c = \frac{\Omega_2 \Omega_3 \Omega_s}{\delta_2},$$

as derived above, $\Omega_c$ is set equal to $\Omega_m$. The modulation amplitude is adjusted such that $$\Omega_2 = \Omega_3 \text{ and } \Omega_s = \frac{\delta_2 \Omega_m}{(\Omega_2)^2}$$

is solved. With a detuning $\delta_2$ equal to 20 MHz and with the parameters simulated above, a minimum detectable signal Rabi frequency $\Omega_{psn}$ of 20 kHz is given. This is converted into units of the electric field with:

$$E_{PSN} = \frac{\Omega_{PSN} h}{1500 e \, a_0} \quad (5)$$

Where the denominator of the right side is the dipole moment of the Rydberg-to Rydberg transition, h is Plank's constant, e is the electron charge, and $a_0$ is the Bohr radius. This provides a photon shot noise limited sensitivity of 0.5 nV/cm, or −175 dBI. Because of these estimates, the modulation scheme discussed above can meet a defined metric of a maximum sensitivity of −165 dBI. A fully simulated system may have a different behavior than the estimates made above, but there is considerable play between $\Omega_2$ and $\delta_2$ and other parameters in the full system that can be optimized.

To estimate phase sensitivity, we use $\Omega_{eff}=\Omega_{eff0} \text{Cos}(\varphi_s-\varphi_m)$. The point where the cosine is most sensitive is considered and it is assumed the difference in phase between signal and modulator is very close to 0. $\Omega_{eff}$ simplifies to:

$$\Omega_{eff} = \Omega_{eff0}(\varphi_s - \varphi_m) \quad (6)$$
$$\Omega_{eff} = \Omega_{eff0}(\delta\varphi)$$

Where $\delta\varphi$ is the minimum measurable phase difference between the signal and the modulator. From $SNR_{PSN}$, an estimate that the minimum measurable change in probe transmission is determined to be $\delta T=2*10^{-7}$. As discussed above and seen in the FIG. 5B, the change in transmission due to a change in signal Rabi frequency is linear and can be given by $\delta T=\text{constant}*\Omega_s$. Where $\Omega_s$ is the signal Rabi frequency and the constant is related to the size of the modulating term in the transmission of atomic physics. From the conversion of the susceptibility $\chi$ to probe transmission in this case, the constant can be estimated to be ~7. Because of the linear relationship between the Rabi-frequency and the signal field, the Equation (6) can be rewritten to give:

$$\delta T = 7 * \Omega_s \delta \phi \quad (7)$$

The minimum change in probe transmission that can be measured is $2*10^{-7}$. A phase sensitivity of 10-100 nrad for a signal field with a Rabi Frequency 1 MHz can be achieved. The sensitivity to phase will improve linearly with the Rabi frequency of the signal field.

Finally, it is noted that with beams on the order of 1 mm in diameter, the transit time broadening is expected to be ~100 kHz and not a limiting factor. Because the pump and probe laser linewidths will be narrowed to ~1 kHz and locked to a common reference, it is expected that laser phase noise will also not be a limiting factor.

Implementation of TRFS embodiments include the use of resonator-based fast switches discussed above. Frequency variations required by the TRFS fall into two categories. Frequency hops are changes to the optical pump frequency in order to address a different target Rydberg level. To meet metrics, changes of several hundred GHz are required. Frequency sweeps are small changes about a given Rydberg transition to adjust the measured frequency or to scan over an EIT absorption feature. The range of the hops described herein is larger than the current capabilities of the fine-tuning frequency sweep system described below, and thus requires the separate system described. To perform fast frequency hops, embodiments of the TRFS will employ a 'hand-off' technique. In order to jump between n~50 and 60, for example, the optical frequency of the 480 nm pump laser must change by ~600 GHz.

Figure 7:
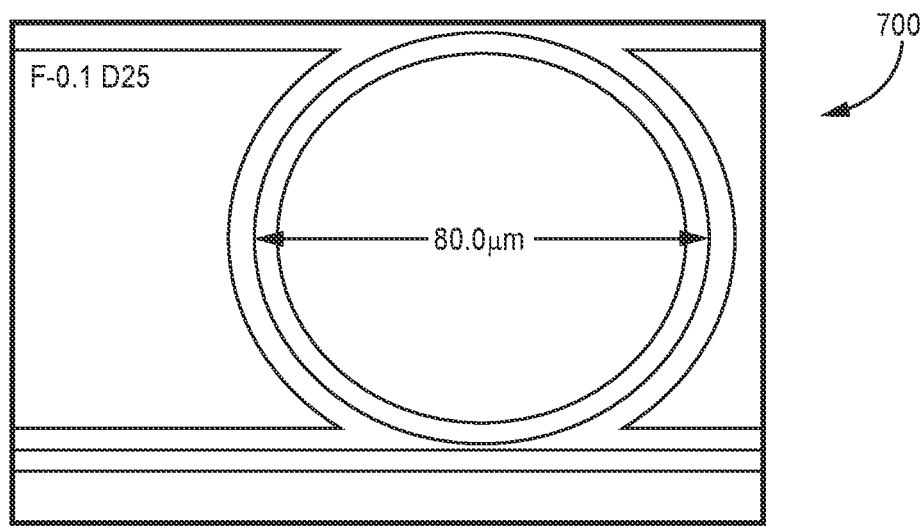
FIG. 7 illustrates a fabricated resonator.

Typical methods for laser tuning by this range (temperature and current) are too slow or don't have the dynamic range to meet a defined metric of channel switching in 10 µs. The 'hand-off' technique employs two or more laser diodes that are coupled to a resonator-based switching circuit to pass only one of the input sources. FIG. 7 illustrates an example of a fabricated resonator 700 similar to those used in some embodiments of the TRFS.

Figure 8B:
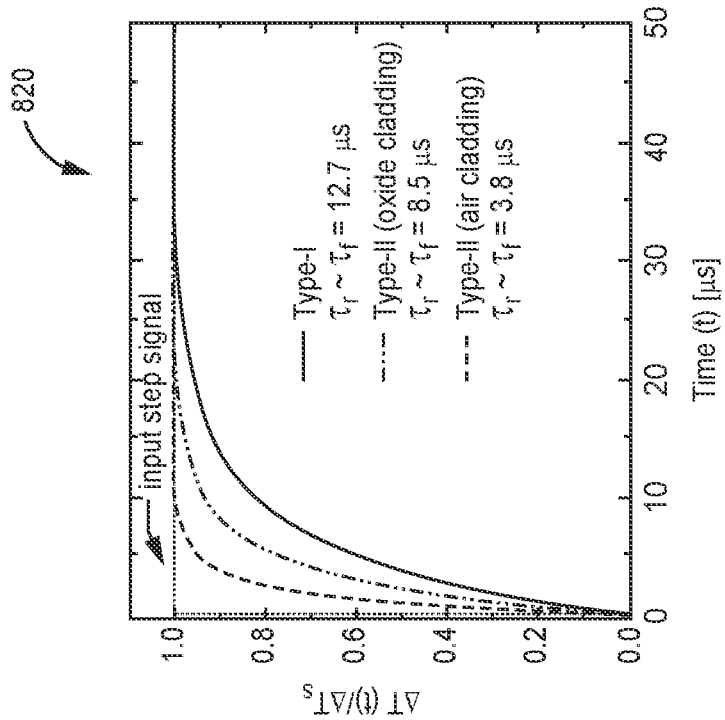
FIG. 8B illustrates a $\Delta T(t)/\Delta T_s$ versus time graph.
Figure 8A:
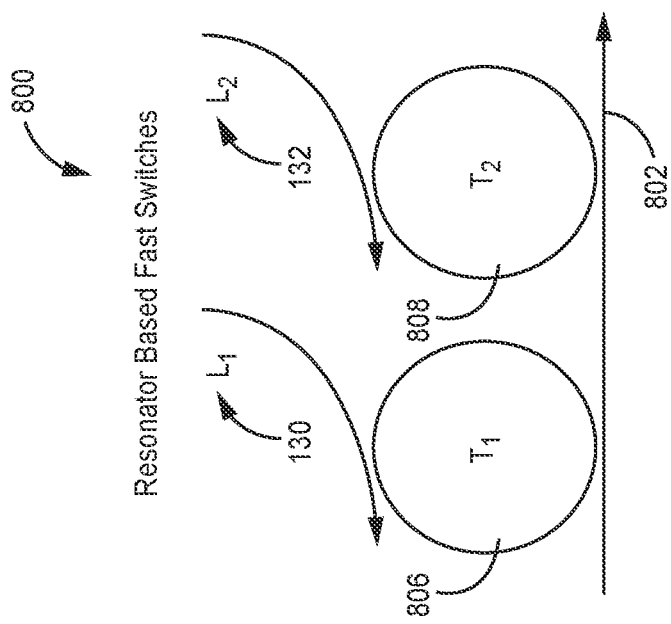
FIG. 8A illustrates a switch diagram according to one exemplary embodiment.

As illustrated in the switch diagram 800 of FIG. 8A, two lasers ($L_1$ and $L_2$), the pump lasers 130 and 132 are coupled to two ring resonators 806 and 808 that are in turn coupled to a common output path 802. The light from either laser $L_1$ or $L_2$ is only transmitted to the output path 802 when the respective resonance condition is met. In particular, the two resonators 806 and 808 are tuned to two different temperatures T1 and T2, will selectively transmit lasers only onto the output path 802 when a laser frequency is in resonance with the resonator modes.

The $\Delta T(t)/\Delta T_s$ vs. time graph 820 of FIG. 8B illustrates the time response of resonators to temperature changes that allow changes in transmission in 10 µs or less. The time response shown FIG. 8B corresponds to silicon waveguides with 2 µm of upper cladding and 2 µm of lower cladding. These cladding thicknesses are critical to determining the response time of a waveguide controlled by a microheater. At an operational wavelength of 960 nm, an embodiment uses a silicon nitride waveguide platform, with an upper and lower cladding thickness of 1.5 µm. Thermodynamic simulations indicate that the resonators with a linewidth of ~100 MHz will have a temperature tuning rate of 4.4 GHz/degree. The proposed waveguide geometry and thermodynamic simulation results are shown in the $\Delta T(t)/\Delta T_s$ vs. time graph 820 indicates that the waveguide geometry can support a switching time of 10 µs or less. A reasonable range of "fast" switching times in an example is between 1 millisecond to 10 microseconds.

During operation, while acquiring data at one optical frequency with the 'active' laser, the second 'inactive' laser will be pre-tuned to the desired level using a combination of current and temperature which may be controlled in part by the controller 120. The second resonator will be tuned such that its resonance frequency is close to the frequency of the second laser. Then at the desired switching time, the second resonator will be brought into resonance while the first resonator is tuned out of resonance with the first laser which then becomes inactive. This is diagrammed in the frequency vs. time switching diagram 830 of FIG. 8C. Diagram 830 illustrates the hand off technique that enables fast frequency hopping.

Figure 8C:
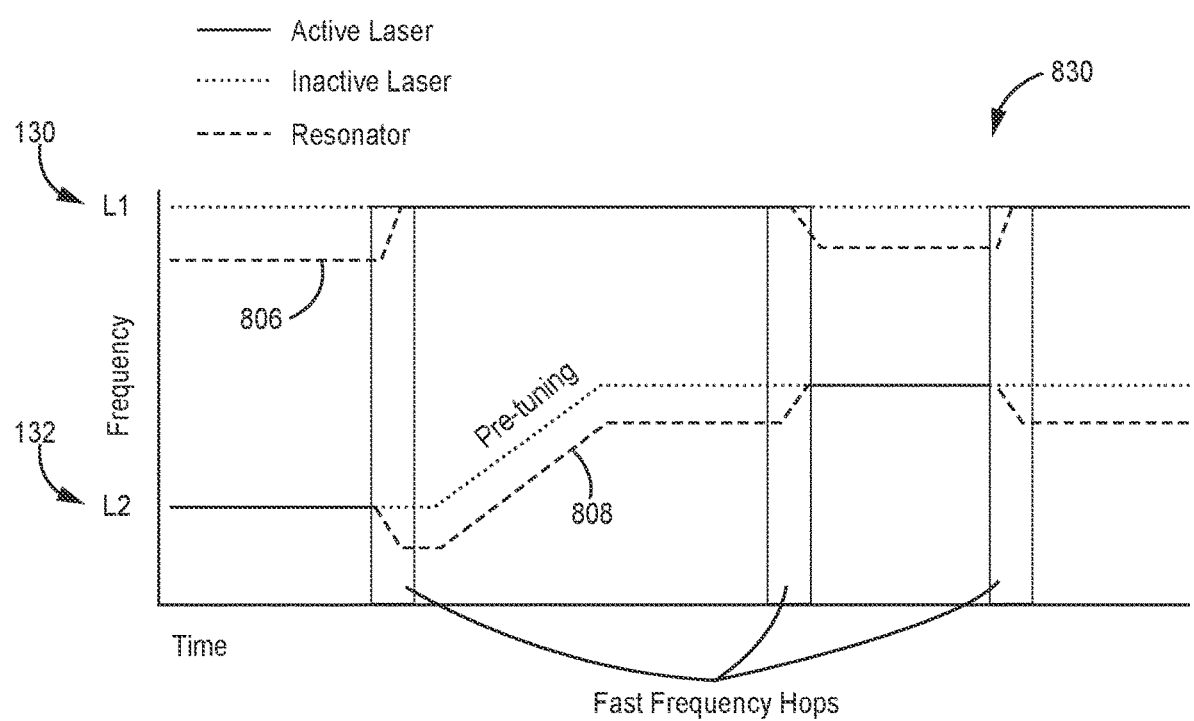
FIG. 8C illustrates a frequency versus time switching graph according to one exemplary embodiment.

As illustrated in the frequency vs. time switching diagram 830 of FIG. 8C, L2, is initially at the resonance of the resonator 808 and is hence active, and L1 is not resonant with its resonator 806 and is inactive. Then at the first hop, the resonator for L1, R1 806, quickly shifts into resonance with L1, and R2 808 quickly shifts out of resonance with L2. This is followed by the pre-tuning of L2, while it is inactive, to a third frequency. The resonator R2 808 follows closely to the laser frequency so that when the next frequency hop is desired, the final tuning of the resonator into resonance can be fast.

If a desired application requires fast switching between two different frequencies back and forth, this could be accomplished with dwell time on the order of the switching time. But if a third frequency is needed, the dwell time will need to be long enough to thermally tune the laser.

If, for particular applications, the dwell time at any target frequency is less than the thermal tuning timescale for a single inactive laser (and associated resonator switch) to tune to the next frequency, this system can be scaled with multiple lasers inputs and resonators. The number of required lasers is 1+(thermal tuning time)/(algorithm dwell time). Using low-loss waveguides (0.08 dB/m), and a fiber-to-chip coupling efficiency (98.5%) it can be anticipated that the transmission through the resonator switches can be kept >95%.

A 780 nm probe laser as part of a laser source lock system 108 and 960 nm pump seed laser(s) as part of a pump laser system 106 will have narrow-linewidth and high frequency agility as described below. The probe laser's absolute frequency may be set by locking it to a separate vapor cell in an example embodiment. This laser will always be tuned to a D2 line. Further, an atom-locked laser may be the reference for an optical transfer cavity to provide an absolute frequency reference for the pump seed laser(s). A frequency comb may be used for the locking function. Other embodiments may include a simplified system using a free spectral resonator (FSR) of a stable resonator to transfer the 780 nm reference to the pump.

As discussed above, an "absolute frequency" is used for reference. Devices that generate a very high relative frequency measurement may not in fact correspond to the real frequency. In atomic physics, often, and in this case, frequencies that are being delt with are accurate to 10 kHz out of an optical frequency that is in the hundreds of THz. Normally a laser or a wavemeter is thought of as having an accurate frequency but for some applications, like those based on optical cavities, the optical frequency can easily be off by many MHz from what might be expected due to manufacturing variances. This may cause the frequency to be easily off by a few nm which changes the wavelength of the measured signal. By referencing the measured frequency to a frequency provided by atomic physics, a real frequency can be determined and referenced. A saturation spectroscopy setup using atoms may be used as to provide the absolute frequency reference.

Figure 9:
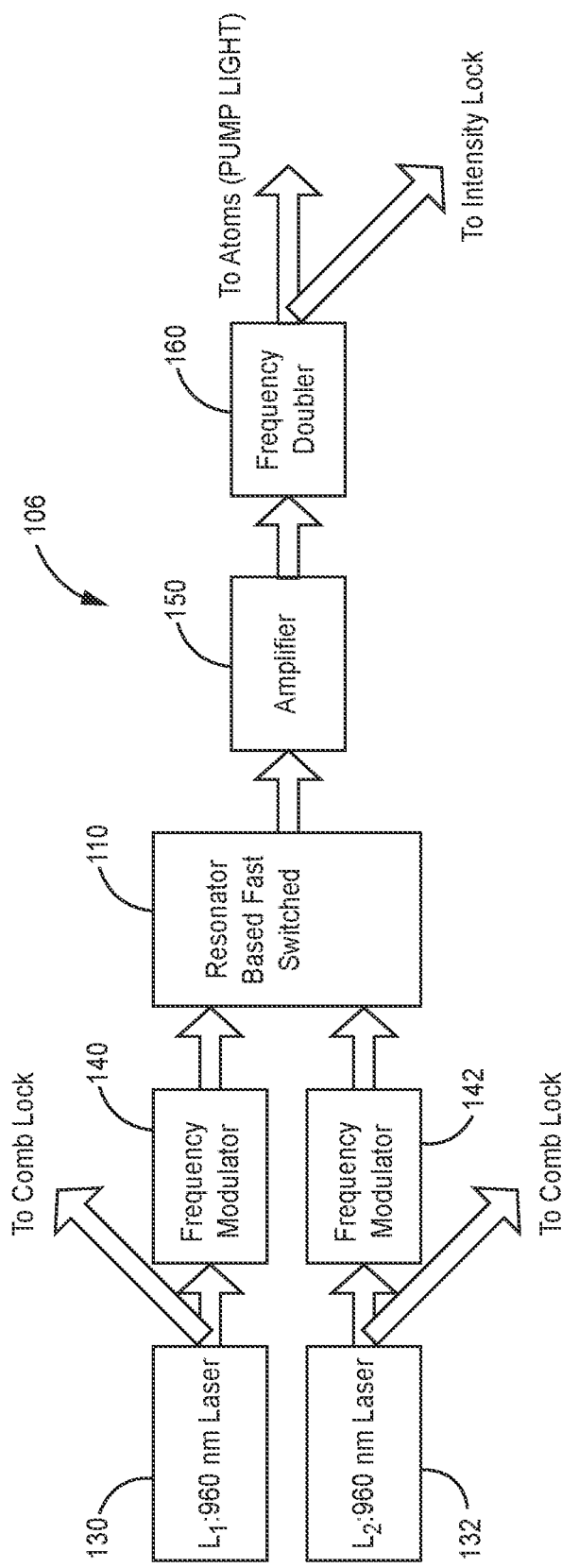
FIG. 9 illustrates a block diagram of a pump laser system according to one exemplary embodiment.

In addition to the provision for frequency hops (coarse tuning) described above, fine tuning may be done with, for example, a 480 nm pump light having a narrow linewidth, high power, several hundred mW, and frequency sweep capability. These requirements are best met with an amplified, the doubled laser source described above and further described in view of FIG. 9. FIG. 9 provides a block diagram of a pump laser system 106 of an example embodiment. The narrow-linewidth 960 nm lasers 130 and 132 driving the optical train 104 can perform frequency hops but will not be called on for frequency sweeps, which will be performed using serrodyne frequency shifters described above.

An output of the seed lasers 130 and 132 (or pump lasers) is frequency tuned and modulated by associated frequency modulators 140 and 142. In one embodiment, the frequency modulators 140 and 142 are electro-optic arrays that perform several functions. One of the functions is an actuator for the RF modulation that produces the LO. Second, these arrays can provide frequency offsets, or time-varying offsets, frequency sweeps or other fine tuning of the probe frequency. The individual frequency-shift stages are based on a modified serrodyne technique in an example embodiment.

Even with an assumption of a relatively high loss coefficient of 30 dB/m of the waveguide, a prediction of 93% transmission of the light through an array of as many as 30 modulators is anticipated. This is because the path length of the resonators is less than 100 um and there is minimal loss at the interface between modulators (which is a waveguide) when the light is already in the chip.

Rather than using a Mach-Zender Interferometer (MZI) to produce the phase ramp, these stages may use a ramp applied to a low-Q ring resonator to enhance the accumulated phase shift by a factor of Q near the resonance. The Q is chosen to be low enough to give a broadband response, but high enough to produce the required enhancement. A set of approximately 30 modulators in series will produce a 5 GHz frequency shift when driven with a 20 V sawtooth with a 4 MHz rep rate (80 V/μs).

As further illustrated in FIG. 9, an output of the frequency modulators 140 and 142 are communicated to the resonator based fast switches (switching circuit 110). The resonator fast switches 110 are described above to selectively couple one of the outputs of the pump lasers 130 and 132 to amplifier 150. The light is then passed through a frequency doubler 160 which in one embodiment is a single-pass waveguide periodically poled lithium niobate (PPLN) frequency doubler 160. The light beam, pump light, is then passed to the atoms in the vapor cell 112. Absolute frequency stability is provided by a frequency lock to an optical comb as discussed below and the final output may be intensity locked as illustrated.

Figure 10A:
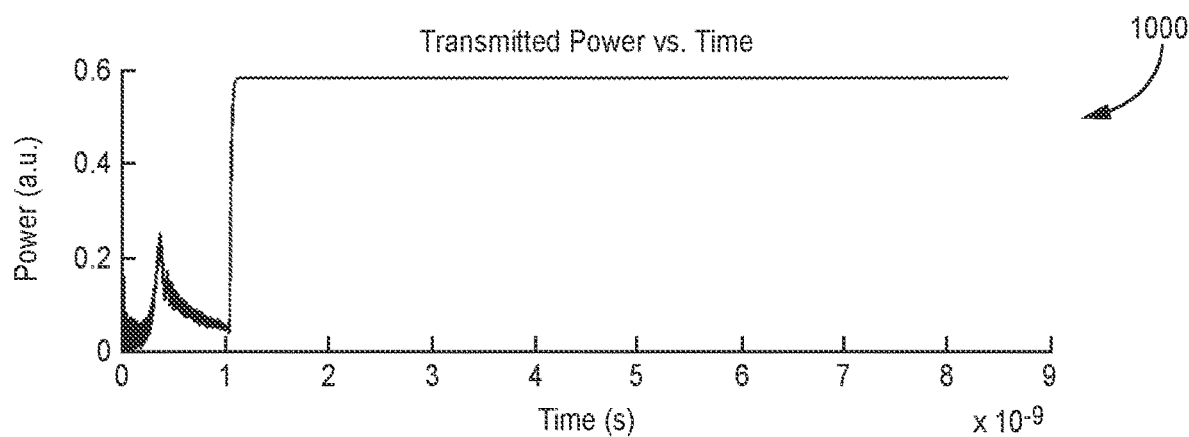
FIG. 10A illustrates a transmitted power versus time graph according to one exemplary embodiment.
Figure 10B:
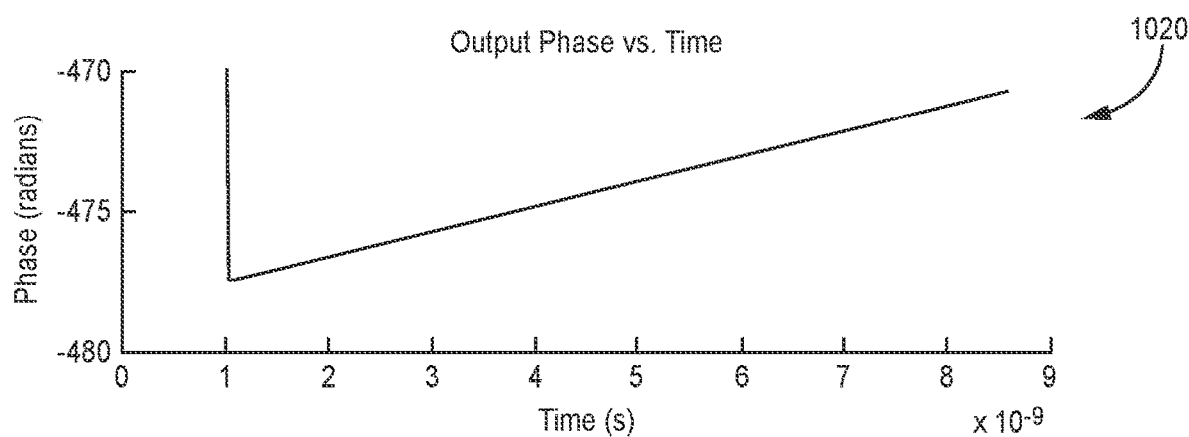
FIG. 10B illustrates an output phase versus time graph according to one exemplary embodiment.

FIG. 10A illustrates a transmitted power versus time graph 1000 using a simulation of a single modulator under conditions showing constant transmitted power and a linear accumulated phase shift consistent with embodiments described herein. FIG. 10B illustrates an output phase versus time graph 1020. FIGS. 10A and 10B illustrate frequency shift performance of resonator-based serrodyne frequency shifters. An instability in transmitted power illustrated during the first nano second of operation is a result of the time it takes light to propagate from the input of the device to the output and is not detrimental to performance.

In some embodiments the serrodyne frequency shifters provide the large frequency jumps by themselves. If the jump frequencies are known before device manufacturing, the Q of the resonators can be increased, enhancing the phase shift but specializing the shifter to a specific frequency. This, together with larger drive voltages, faster ramp rates, and a reasonable number of additional cascaded stages (enabled by advances which decrease waveguide loss) could eventually give frequency shifts of 300 GHz or more, alleviating the requirements of the resonator switches. For example, by quadrupling the Q and applying a 1000 V/μs voltage ramp, a 300 GHz shift is within reach. (Trek advertises a 2 kV/s, 150 V voltage source.)

Because all modulation and switching takes place before the final amplification and frequency doubling (of the pump), optical losses from the source to the amplifier only need to be kept sufficiently small to seed the amplifier. Commercial external cavity diode lasers can have outputs of approximately 100 mW. Accounting for loss from 30 modulators, and the loss in the resonator switch, the necessary seed strength of greater than 20 mW into the amplifier will easily be exceeded.

As described above, after the modulators, light from one of the pump lasers 130 and 132 passes through (or is blocked by) the resonator-based switch 110, the passing light is amplified by amplifier 150 and finally doubled by frequency doubler 160 to produce 480 nm in an example embodiment. As also discussed above, the frequency doubler 160 may be a single-pass wave-guided PPLN. An efficiency of about 50 percent is expected, which, with 2 W input from the amplifiers would allow for several hundred mW in both the coupling beam and the modulated coupling beam. The single-pass configuration is chosen for its large bandwidth, required for the large tuning range of our laser source. The laser intensity will be locked with feedback to the amplifier 150.

The absolute frequency of the pump laser system 106 will be tuned to Rydberg levels by referencing it to the 780 nm atom lock through a frequency comb with the laser source lock system 108. A comb (or other transfer cavity) is used rather than direct locking to the relevant Rydberg level (in a separate vapor cell), in some embodiments, because of very large amount of blue power that would be required to obtain a good SNR for the lock, and the speed of acquiring an atom lock.

High-sensitivity Rydberg sensors require narrow-linewidth tunable laser sources. It may be advantageous to integrate these laser sources using a laser die that is tightly coupled to small tunable cavities, such as the piezo-tuned cavities. However, commercially available lasers and line-narrowing by locking to more conventional cavities may be used.

Example, nominal laser frequencies for the Rydberg sensor are 780 nm (probe) and 480 nm pump). Example embodiments source 960 nm light and frequency-double to get 480 nm because of the higher performance of NIR integrated photonics components and the lack of high power blue direct diode lasers. Thus, the laser system example may consist of a 780 nm source and two or more 960 nm sources.

Narrow line-width pump and probe lasers with low differential phase noise are key to low-noise Rydberg EIT measurements. The noise on an EIT measurement is directly correlated with the relative noise between the pump and the probe and can be reduced considerably by locking them to a common reference.

Figure 11:
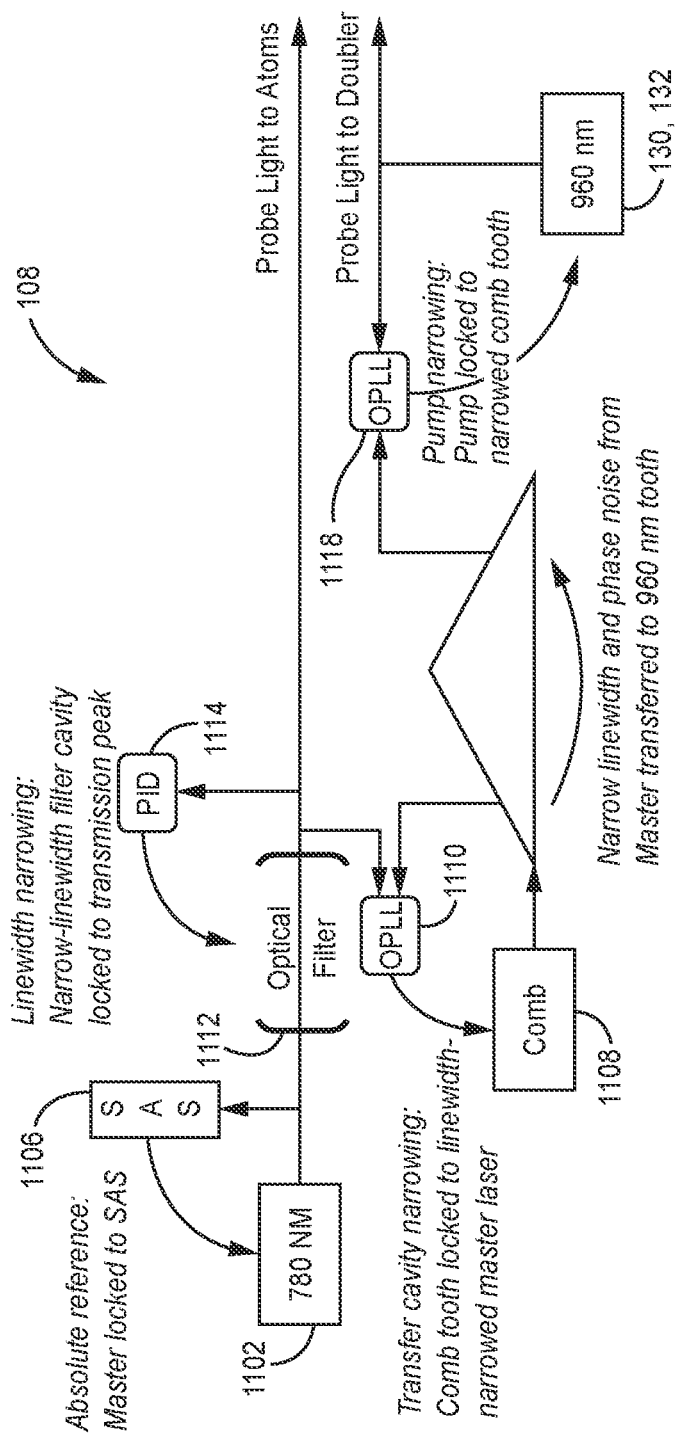
FIG. 11 illustrates a block diagram of a laser source lock system according to one exemplary embodiment.

An example of a laser source lock system 108 is illustrated in the block diagram of FIG. 11. As illustrated, the laser source lock system 108 of this example embodiment includes a master laser 1102 that has an absolute reference locked to a saturated absorption spectroscopy (SAS) 1106. A light output of the master laser 1102 is passed through an optical filter 1112. A proportional-integral-derivative (PID) controller 1114 is used to lock the optical filter 1112 (narrow-linewidth filter cavity) to a transmission peak.

An optical phase lock loop (OPLL) 1110 is in communication with a comb 1108 to lock a comb tooth of the comb 1108 to the linewidth-narrow master laser light. An output of the comb 1108 is passed to OPLL 1110 and to an input of OPLL 1118. OPLL 1118 is in communication with the pump lasers 130 and 132 of the pump laser system 106, to lock the pump lasers 130 and 132 to the comb 1108. An output of the pump lasers 130 and 132 is coupled to an input of OPLL 1118 and is coupled to the doubler 160 as discussed above.

In an example laser source lock system 108 of FIG. 11, control of the pump laser system 106 is accomplished with the 780 nm master laser 1102 that is locked to $^{87}$Rb D2 line as an absolute frequency reference. This sets the master laser linewidth to less than 1 MHz (linewidth of $^{87}$Rb D2 line). The probe light from the master laser 1102 is filtered by an optical filter 1112 with one example embodiment being a narrow-linewidth filter cavity 1112, that further narrows the probe light to approximately 1 kHz linewidth. The filter cavity 1112 is used in transmission; thus, a Pound-Drever-Hall (PDH) lock to the filter cavity 1112 is not required and a simple lock of the filter cavity 1112 to the transmission peak is used in an embodiment. The linewidth of the transmitted beam is that of the cavity resonance, not the bandwidth of the servo circuit.

A tooth or resonance of a transfer cavity such as the optical frequency comb 1108 at 780 nm is locked to the narrowed master laser 1102. This transfers the master linewidth and phase noise to the comb 1108, which in turn transfers it to the 960 nm laser pumps 130 and 132 via OPLL 1018. The Master laser 1102 then becomes the Rydberg probe. Thus, the differential phase noise between the pump laser(s) 130 and 132 and Rydberg probe is driven down, giving a low-noise EIT measurement.

By using a frequency comb 1108 as a transfer cavity, the pump frequency can be changed within its mode-hop-free tuning range by changing the comb repetition rate. This can be used for slower frequency ramps but does not provide fast enough ramps for applications (because of piezo elements in the comb mechanism). Thus, embodiments provide fast frequency ramps using serrodyne frequency shifters as described above.

EXAMPLE EMBODIMENTS

Example 1 is a continuously tunable radio frequency (RF) sensor system. The sensor system includes a vapor cell with alkali atoms, an optical train, and a detector. The optical train includes a laser source lock system and a pump laser system. The laser source lock system is configured to generate probe light of a first wavelength. The pump laser system is configurate to generate pump light of a select second wavelength. The pump laser system includes at least a first pump laser to generate a first laser light of the select second wavelength, at least a second pump laser to generate a second laser light of the select second wavelength, at least one frequency modulator, a switch system and a frequency doubler. The probe light is in communication with the first pump laser and the second pump laser to ensure a frequency of the first pump laser and the second pump laser is referenced to the alkali atoms in the vapor cell. The at least one frequency modulator is configured to provide a local oscillator and at least one of frequency offsets, time-varying offsets and frequency sweeps to the first laser light and the second laser light. The switch system is configured to pass one of the first laser light and the second laser light to an amplifier. The frequency doubler is coupled to receive amplified laser light from the amplifier. The frequency doubler is configured to double a frequency of the amplified laser light to generate the pump light, the pump light and probe light transmitted through the vapor cell. The detector is configured to measure the probe light passed through the vapor cell to determine if an RF signal has been detected.

Example 2 includes the sensor system of Example 1, wherein the switch system includes resonator based switches.

Example 3 includes the sensor system of any of the Examples 1-2, wherein the at least one frequency modulator further includes a first frequency modulator to modulate the first laser light and a second frequency modulator to modulate the second laser light.

Example 4 includes the sensor system of any of the Examples 1-3, wherein the at least one frequency modulator further includes an array of lithium niobate electro-optic modulators and serrodyne frequency shifters.

Example 5 includes the sensor system of any of the Examples 1-4, wherein the local oscillator provided by the at least one frequency modulator allows a heterodyne measurement at the detector.

Example 6 includes the sensor system of any of the Examples 1-5, further including a first optical phase lock loop, a frequency comb and a second optical phase lock loop. The first optical phase lock loop is in communication with a master laser of the laser source lock system. The frequency comb is in communication with the first optical phase lock loop. The second optical phase lock loop is in communication with the frequency comb. The second optical phase loop is further in communication with the first and second pump lasers.

Example 7 includes the sensor system of Example 6, wherein an absolute reference of the probe light is locked to a saturated absorption spectroscopy.

Example 8 includes the sensor system of any of the Examples 6-7 further including an optical filter to filter the probe light from the master laser.

Example 9 includes the sensor system of any of the Examples 1-8, further including at least one controller, a memory an input/output. The at least one controller in communication with the at least one the frequency modulator, switch system and detector. The memory is configured to store at least one of operational instructions for the controller and information related to detected RF signals. The controller is in communication with the memory. The input/output is in communication with the controller and is configured to at least one of convey detected RF signals and provided an interface that allows a user to provide operating instructions that are stored in the memory.

Example 10 includes a sensor system that includes a vapor cell including alkali atoms, an optical train, a pump laser system and a detector. The optical train includes a laser lock system. The laser lock system includes a master laser, a first optical phase lock loop, a frequency comb and a second optical phase lock loop. The master laser generates a probe light of a first wavelength. The first optical phase lock loop is in communication with a master laser of the laser source lock system. The frequency comb is in communication with the first optical phase lock loop. The second optical phase lock loop is in communication with the frequency comb. The pump laser system is configured to generate pump light of a select second wavelength. The pump laser system includes at least one first pump laser, at least one second pump laser, at least one frequency modulator, a resonator based fast switch system and a frequency doubler. The at least one first pump laser is used to generate a first laser light of the select second wavelength. The at least a second pump laser is used to generate a second laser light of the select second wavelength. The first pump laser and the second pump laser are in communication with the second optical phase loop to provide frequency references for the first pump laser and the second pump laser. The at least one frequency modulator is configured to provide a local oscillator and at least one of frequency offsets, time-varying offsets and frequency sweeps to the first laser light and the second laser light. The resonator based fast switch system is configured to pass one of the first laser light and the second laser light to an amplifier. The frequency doubler is coupled to receive amplified laser light from the amplifier. The frequency doubler is configured to double a frequency of the amplified laser light to generate the pump light, the pump light and probe light transmitted through the vapor cell. The detector is configured to measure the probe light passed through the vapor cell to determine if an RF signal has been detected.

Example 11 includes the sensor system of Example 10, wherein the at least one frequency modulator further includes a first frequency modulator to modulate the first laser light and a second frequency modulator to modulate the second laser light.

Example 12 includes the sensor system of any of the Examples 10-11, wherein the at least one frequency modulator includes an array of lithium niobate electro-optic modulators.

Example 13 includes a method of detecting radio frequency (RF) signals, the method includes, generating a first laser light of a first wavelength with a first laser; generating a second laser light of the first wavelength with a second laser; providing frequency references for the first laser light and the second laser light with a probe light having a second wavelength; selectively switching between passing the first laser light and the second laser light to an amplifier; modulating the first laser light and second laser light to select frequencies before the first laser light and the second laser light are selectively passed to the amplifier; amplifying the passed first laser light and second laser light with the amplifier; doubling the frequency of the amplified first laser light and second laser light to generate pump light; passing the pump light and the probe light through a vapor cell; and measuring the probe light to determine if an RF signals is present.

Example 14 includes the method of Example 13 wherein the switching between the passing of the first laser light and the second laser light to an amplifier is provided with resonator based switches.

Example 15 includes the method of any of the Examples 13-14, further including pre-tuning the frequency of first laser light and second laser lights before switching to pass the first laser light and the second laser light.

Example 16 includes the method of any of the Examples 13-15, further including generating the probe light with a laser source system.

Example 17 includes the method of Example 16, wherein the generating the probe light further includes locking an absolute reference of a master laser to a saturation absorption spectroscopy; and passing an output of the master laser through an optical filter that is locked to a transmission peak with a proportional-integral-derivative controller to generate master laser light with a narrow line-width.

Example 18 includes the method of any of the Examples 13-17, wherein providing frequency references for the first laser light and the second laser light with a probe light having a second wavelength further includes communicating the probe light to a first optical phase lock loop that is in communication with a frequency comb; locking a comb tooth of the frequency comb to the probe light; and communicating an output of the frequency comb to an input of a second optical phase lock loop that is in communication with the first laser and the second laser.

Example 19 includes the method of any of the Examples 13-18, further including checking the frequency of the probe light against a saturation absorption spectroscopy.

Example 20 includes the method of any of the Examples 13-19 wherein modulating further includes producing a local oscillator; and providing at least one of frequency offsets, time-varying offsets and frequency sweeps.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A continuously tunable radio frequency (RF) sensor system, the sensor system comprising:
   a vapor cell including alkali atoms;
   an optical train including,
      a laser source lock system configured to generate probe light of a first wavelength;
      a pump laser system configured to generate pump light of a select second wavelength, the pump laser system including,
         at least a first pump laser to generate a first laser light of the select second wavelength,
         at least a second pump laser to generate a second laser light of the select second wavelength, the probe light in communication with the first pump laser and the second pump laser to ensure a frequency of the first pump laser and the second pump laser is referenced to the alkali atoms in the vapor cell,
         at least one frequency modulator configured to provide a local oscillator and at least one of frequency offsets, time-varying offsets and frequency sweeps to the first laser light and the second laser light,
      a switch system configured to pass one of the first laser light and the second laser light to an amplifier, and
      a frequency doubler coupled to receive amplified laser light from the amplifier, the frequency doubler configured to double a frequency of the amplified laser light to generate the pump light, the pump light and probe light transmitted through the vapor cell; and
   a detector configured to measure the probe light passed through the vapor cell to determine if an RF signal has been detected.

2. The sensor system of claim 1, wherein the switch system includes resonator based switches.

3. The sensor system of claim 1, wherein the at least one frequency modulator further comprising:
   a first frequency modulator to modulate the first laser light; and
   a second frequency modulator to modulate the second laser light.

4. The sensor system of claim 1, wherein the at least one frequency modulator further comprises:
   an array of lithium niobate electro-optic modulators; and
   serrodyne frequency shifters.

5. The sensor system of claim 1, wherein the local oscillator provided by the at least one frequency modulator allows a heterodyne measurement at the detector.

6. The sensor system of claim 1, further comprising:
   a first optical phase lock loop in communication with a master laser of the laser source lock system;
   a frequency comb in communication with the first optical phase lock loop; and second optical phase lock loop in communication with the frequency comb, the second optical phase loop further in communication with the first and second pump lasers.

7. The sensor system of claim 6, wherein an absolute reference of the probe light is locked to a saturated absorption spectroscopy.

8. The sensor system of claim 6, further comprising:
an optical filter to filter the probe light from the master laser.

9. The sensor system of claim 1, further comprising:
at least one controller in communication with the at least one frequency modulator, switch system and detector;
a memory to store at least one of operational instructions for the controller and information related to detected RF signals, the controller in communication with the memory; and
an input/output in communication with the controller configured to at least one of convey detected RF signals and provided an interface that allows a user to provide operating instructions that are stored in the memory.

10. A continuously tunable radio frequency (RF) sensor system, the sensor system comprising:
a vapor cell including alkali atoms;
an optical train including,
    a laser source lock system including,
        a master laser to generate a probe light of a first wavelength,
        a first optical phase lock loop in communication with a master laser of the laser source lock system,
        a frequency comb in communication with the first optical phase lock loop, and
        a second optical phase lock loop in communication with the frequency comb;
    a pump laser system configured to generate pump light of a select second wavelength, the pump laser system including,
        at least a first pump laser to generate a first laser light of the select second wavelength,
        at least a second pump laser to generate a second laser light of the select second wavelength, the first pump laser and the second pump laser in communication with the second optical phase loop to provide frequency references for the first pump laser and the second pump laser,
        at least one frequency modulator configured to provide a local oscillator and at least one of frequency offsets, time-varying offsets and frequency sweeps to the first laser light and the second laser light,
        a resonator based fast switch system configured to pass one of the first laser light and the second laser light to an amplifier, and
        a frequency doubler coupled to receive amplified laser light from the amplifier, the frequency doubler configured to double a frequency of the amplified laser light to generate the pump light, the pump light and probe light transmitted through the vapor cell; and
    a detector configured to measure the probe light passed through the vapor cell to determine if an RF signal has been detected.

11. The sensor system of claim 10, wherein the at least one frequency modulator further comprises:
a first frequency modulator to modulate the first laser light; and
a second frequency modulator to modulate the second laser light.

12. The sensor system of claim 10, wherein the at least one frequency modulator includes an array of lithium niobate electro-optic modulators.

13. A method of detecting radio frequency (RF) signals, the method comprising:
generating a first laser light of a first wavelength with a first laser;
generating a second laser light of the first wavelength with a second laser;
providing frequency references for the first laser light and the second laser light with a probe light having a second wavelength;
selectively switching between passing the first laser light and the second laser light to an amplifier;
modulating the first laser light and second laser light to select frequencies before the first laser light and the second laser light are selectively passed to the amplifier;
amplifying the passed first laser light and second laser light with the amplifier;
doubling the frequency of the amplified first laser light and second laser light to generate pump light;
passing the pump light and the probe light through a vapor cell; and
measuring the probe light to determine if an RF signals is present.

14. The method of claim 13, wherein the switching between the passing of the first laser light and the second laser light to an amplifier is provided with resonator based switches.

15. The method of claim 13, further comprising:
pre-tuning the frequency of first laser light and second laser lights before switching to pass the first laser light and the second laser light.

16. The method of claim 13, further comprising:
generating the probe light with a laser source system.

17. The method of claim 16, wherein the generating the probe light further comprises:
locking an absolute reference of a master laser to a saturation absorption spectroscopy; and
passing an output of the master laser through an optical filter that is locked to a transmission peak with a proportional-integral-derivative controller to generate master laser light with a narrow line-width.

18. The method of claim 13, wherein providing frequency references for the first laser light and the second laser light with a probe light having a second wavelength further comprises:
communicating the probe light to a first optical phase lock loop that is in communication with a frequency comb;
locking a comb tooth of the frequency comb to the probe light; and
communicating an output of the frequency comb to an input of a second optical phase lock loop that is in communication with the first laser and the second laser.

19. The method of claim 13, further comprising:
checking the frequency of the probe light against a saturation absorption spectroscopy.

20. The method of claim 13, wherein modulating further comprises:
producing a local oscillator; and
providing at least one of frequency offsets, time-varying offsets and frequency sweeps.

* * * * *